United States Patent
Kitada et al.

(10) Patent No.: US 11,458,577 B2
(45) Date of Patent: *Oct. 4, 2022

(54) ALUMINUM ALLOY BRAZING SHEET FOR HEAT EXCHANGER

(71) Applicant: UACJ Corporation, Tokyo (JP)

(72) Inventors: Yukie Kitada, Tokyo (JP); Naoki Yamashita, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 16/638,949

(22) PCT Filed: Jul. 23, 2018

(86) PCT No.: PCT/JP2018/027422
§ 371 (c)(1),
(2) Date: Feb. 13, 2020

(87) PCT Pub. No.: WO2019/035316
PCT Pub. Date: Feb. 21, 2019

(65) Prior Publication Data
US 2020/0223017 A1     Jul. 16, 2020

(30) Foreign Application Priority Data
Aug. 17, 2017   (JP) .............................. JP2017-157369

(51) Int. Cl.
| | |
|---|---|
| *B23K 35/28* | (2006.01) |
| *B23K 35/02* | (2006.01) |
| *F28F 21/08* | (2006.01) |
| *B32B 15/01* | (2006.01) |
| *C22C 21/02* | (2006.01) |
| *C22C 21/14* | (2006.01) |

(52) U.S. Cl.
CPC ........ *B23K 35/286* (2013.01); *B23K 35/0233* (2013.01); *B32B 15/016* (2013.01); *C22C 21/02* (2013.01); *C22C 21/14* (2013.01); *F28F 21/089* (2013.01); *F28F 21/084* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 6,129,143 A | 10/2000 | Hasegawa et al. | |
| 9,976,200 B2 | 5/2018 | Ando et al. | |
| 11,370,067 B2 | 6/2022 | Kitada et al. | |
| 2016/0319399 A1* | 11/2016 | Ando | C22F 1/057 |
| 2018/0193960 A1* | 7/2018 | Asano | C22C 21/00 |
| 2019/0084094 A1 | 3/2019 | Teramoto et al. | |

FOREIGN PATENT DOCUMENTS

| | | | | |
|---|---|---|---|---|
| BR | 112018068185-7 A2 | 10/2017 | | |
| BR | 112020002156-3 A2 | 7/2020 | | |
| CN | 1982047 A | 6/2007 | | |
| CN | 1990227 A | 7/2007 | | |
| CN | 105814219 A | 7/2016 | | |
| EP | 1795294 A1 | 6/2007 | | |
| EP | 1795295 A1 | 6/2007 | | |
| EP | 3121301 A1 | 1/2017 | | |
| JP | 60251243 A | 12/1985 | | |
| JP | H04-36600 A * | 2/1992 | | |
| JP | 7179969 A | 7/1995 | | |
| JP | 2008-516090 A | 5/2008 | | |
| JP | 2009-041042 A | 2/2009 | | |
| JP | 2009-161826 A | 7/2009 | | |
| JP | 2011-520032 A | 7/2011 | | |
| JP | 2017020109 A * | 1/2017 | ............... | C22F 1/04 |
| WO | 2009142651 A2 | 11/2009 | | |
| WO | 2015/132482 A1 | 9/2015 | | |

OTHER PUBLICATIONS

Chinese Office Action with English Translation issued in corresponding Chinese Application No. 201880053390.5 dated Feb. 5, 2021 (31 pages).
English International Search Report for corresponding PCT/JP2018/027422, dated Oct. 16, 2018 (1 page).
Japanese International Search Report and Written Opinion for corresponding PCT/JP2018/027422, dated Oct. 16, 2018 (7 pages).
Indian Office Action issued in corresponding Indian Application No. 202017003197, dated Feb. 22, 2022 (7 pages).
Brazilian Office Action with partial English translation issued in corresponding Brazilian Application No. 112020002150-4 dated Jul. 5, 2022 (6 pages).

\* cited by examiner

*Primary Examiner* — Xiaobei Wang
(74) *Attorney, Agent, or Firm* — Flynn Thiel, P.C.

(57) ABSTRACT

An aluminum alloy brazing sheet for a heat exchanger includes a three-layer material in which a brazing material layer, an intermediate layer, and a core material are cladded and stacked, the intermediate layer is formed of an aluminum alloy which can include Mn, Si, Fe, and Cu, with the balance being Al and inevitable impurities, the core material is formed of an aluminum alloy which can include Si, Fe, Cu, and Mn, with the balance being Al and inevitable impurities, and the brazing material layer is formed of an aluminum alloy including Si, with the balance being Al and inevitable impurities.

10 Claims, No Drawings

ALUMINUM ALLOY BRAZING SHEET FOR HEAT EXCHANGER

TECHNICAL FIELD

The present invention relates to an aluminum alloy brazing sheet for a heat exchanger, and an aluminum alloy brazing sheet used for manufacturing a member necessarily having a closed space inside, such as a tube, a header, and a tank of a heat exchanger.

BACKGROUND ART

Generally, aluminum alloy having light weight and good heat conductivity is used for heat exchangers for automobiles, such as evaporators, capacitors, radiators, and heaters. These heat exchangers generally adopt a method of processing, for example, an aluminum alloy plate material into a predetermined shape to form a coolant passage, adhering fluoride-based flux onto a surface and a bonding part thereof, assembling the structure with members, such as a fin member, into a predetermined structure, and performing brazing joint in a heating furnace of an inert gas atmosphere.

In recent years, from the viewpoint of reduction in environmental load, reduction in weight of heat exchangers has been performed to improve the fuel consumption of automobiles. This reduction requires thinning of members, such as tube members, but, in particular, the external surface air side of each of heat exchangers is exposed to a harsh corrosion environment. In tube members, when penetration occurs due to corrosion, the coolant or the like leaks, and the function thereof is immediately lost. For this reason, improvement in corrosion resistance on the external surface side of the tube members is required.

In prior art, the main stream of design to achieve the improvement is a design to attach a fin with a lower potential to an external surface of a coolant tube formed of a tube member including no sacrificial layer, to use the fin as a sacrificial anode to prevent corrosion of the tube. However, in this case, no sufficient corrosion resistance is achieved after the fin is corroded and worn, and when the fin has been detached from the tube due to corrosion of the bonding portion between the fin and the tube, and in a part distant from the fin even when the fin is soundly bonded and remains.

As means for solving this problem, for example, PCT International Publication No. WO2015/132482 (Patent Literature 1) has presented a brazing sheet having an improved clad rolling property with a tube formed by cladding an intermediate material formed of an aluminum alloy including Mn of 0.35 to 1.8% and the other elements of 0.3% or less.

In addition, Japanese Translation of PCT International Application Publication No. 2008-516090 (Patent Literature 2) also discloses a brazing sheet including an intermediate layer formed of a 1000 series aluminum alloy. This structure is to secure high strength by preventing recrystallization of the core material after brazing, separate the core material from the brazing material with an intermediate layer, and prevent erosion occurring during brazing by recrystallizing the intermediate layer during brazing.

PRIOR ART LITERATURES

Patent Literatures

Patent Literature 1: PCT International Publication No. WO2015/132482

Patent Literature 2: Japanese Translation of PCT International Application No. 2008-516090

SUMMARY OF INVENTION

Problem to be Solved by Invention

However, Patent Literatures 1 and 2 described above fail to achieve sufficient corrosion resistance in a harsh corrosion environment on the market, and further improvement in corrosion resistance is required.

For this reason, an object of the present invention is to provide an aluminum alloy brazing sheet for manufacturing a member of a heat exchanger with excellent corrosion resistance.

Means for Solving Problem

The present invention provides (1) an aluminum alloy brazing sheet for a heat exchanger, the aluminum alloy brazing sheet including a three-layer material in which an air-side surface of a core material is cladded and stacked with an intermediate layer and a brazing material layer in this order from the core material side, in which the intermediate layer is formed of an aluminum alloy including Mn of 0.2 mass % or more and less than 0.35 mass %, Si of 0.6 mass % or less, Fe of 0.7 mass % or less, and Cu of 0.1 mass % or less, with the balance being Al and inevitable impurities, the core material is formed of an aluminum alloy including Si of 1.2 mass % or less, Fe of 1.0 mass % or less, Cu of 0.3 mass % or more and 1.0 mass % or less, and Mn of 0.5 mass % or more and 2.0 mass % or less, with the balance being Al and inevitable impurities, and the brazing material layer is formed of an aluminum alloy including Si of 4 mass % or more and 13 mass % or less, with the balance being Al and inevitable impurities.

The present invention provides (2) the aluminum alloy brazing sheet for a heat exchanger according to (1), in which the aluminum alloy forming the intermediate layer further includes one or two or more of Ti of 0.3 mass % or less, Zr of 0.3 mass % or less, and Cr of 0.3 mass % or less.

The present invention provides (3) the aluminum alloy brazing sheet for a heat exchanger according to (1) or (2), in which the aluminum alloy forming the core material further includes one or two or more of Ti of 0.3 mass % or less, Zr of 0.3 mass % or less, and Cr of 0.3 mass % or less.

The present invention provides (4) the aluminum alloy brazing sheet for a heat exchanger according to any one of (1) to (3), in which the aluminum alloy forming the brazing material layer further includes Sr of 0.1 mass % or less.

The present invention provides (5) the aluminum alloy brazing sheet for a heat exchanger according to any one of (1) to (4), in which the intermediate layer has a clad ratio of 5 to 30%.

The present invention provides (6) the aluminum alloy brazing sheet for a heat exchanger according to any one of (1) to (5), in which the brazing material layer has a clad ratio of 5 to 20%.

The present invention provides (7) the aluminum alloy brazing sheet for a heat exchanger according to any one of (1) to (6), in which, in a manufacturing process, at least the aluminum alloy forming the core material is subjected to homogenization, subjected to clad hot rolling and cold rolling after the homogenization, subjected to no annealing during the cold rolling, and subjected to recrystallization annealing only at a final thickness.

The present invention provides (8) the aluminum alloy brazing sheet for a heat exchanger according to any one of (1) to (6), in which, in a manufacturing process, at least the aluminum alloy forming the core material is subjected to homogenization, subjected to clad hot rolling and cold rolling after the homogenization, subjected to no annealing during the cold rolling, and subjected to recovery annealing only at a final thickness.

The present invention provides (9) the aluminum alloy brazing sheet for a heat exchanger according to any one of (1) to (6), in which, in a manufacturing process, at least the aluminum alloy forming the core material is subjected to homogenization, subjected to clad hot rolling and cold rolling after the homogenization, subjected to recrystallization annealing or recovery annealing during the cold rolling, and subjected to cold rolling to acquire a final thickness after the recrystallization annealing or the recovery annealing.

The present invention provides (10) the aluminum alloy brazing sheet for a heat exchanger according to any one of (1) to (6), in which, in a manufacturing process, at least the aluminum alloy forming the core material is subjected to homogenization, subjected to clad hot rolling and cold rolling after the homogenization, subjected to recovery annealing during the cold rolling, subjected to cold rolling to acquire a final thickness after the recovery annealing, and subjected to further recovery annealing after the cold rolling to acquire the final thickness.

Effect of Invention

The present invention provides an aluminum alloy brazing sheet for manufacturing a member of a heat exchanger with excellent corrosion resistance.

EMBODIMENT OF INVENTION

An aluminum alloy brazing sheet for a heat exchanger according to the present invention includes a three-layer material in which an air-side surface of a core material is cladded and stacked with an intermediate layer and a brazing material layer in this order from the core material side.

The intermediate layer is formed of an aluminum alloy including Mn of 0.2 mass % or more and less than 0.35 mass %, Si of 0.6 mass % or less, Fe of 0.7 mass % or less, and Cu of 0.1 mass % or less, with the balance being Al and inevitable impurities.

The core material is formed of an aluminum alloy including Si of 1.2 mass % or less, Fe of 1.0 mass % or less, Cu of 0.3 mass % or more and 1.0 mass % or less, and Mn of 0.5 mass % or more and 2.0 mass % or less, with the balance being Al and inevitable impurities.

The brazing material layer is formed of an aluminum alloy including Si of 4 mass % or more and 13 mass % or less, with the balance being Al and inevitable impurities.

The aluminum alloy brazing sheet for a heat exchanger according to the present invention is an aluminum alloy brazing sheet used for manufacturing a member necessarily having a closed space inside, such as a tube, a header, and a tank of a heat exchanger.

The aluminum alloy brazing sheet for a heat exchanger according to the present invention includes a three-layer material in which an air-side surface of a core material is cladded and stacked with an intermediate layer and a brazing material layer in this order from the core material side. Specifically, in the aluminum alloy brazing sheet for a heat exchanger according to the present invention, the brazing material layer, the intermediate layer, and the core material are stacked such that the brazing material layer, the intermediate layer, and the core material are arranged in order from the air side, that is, the external surface side, when the aluminum alloy brazing sheet is formed into a member for a heat exchanger.

The core material of the aluminum alloy brazing sheet for a heat exchanger is formed of an aluminum alloy including Si of 1.2 mass % or less, Fe of 1.0 mass % or less, Cu of 0.3 mass % or more and 1.0 mass % or less, and Mn of 0.5 mass % or more and 2.0 mass % or less, with the balance being Al and inevitable impurities.

Mn improves the strength, and ennobles the potential by solid solution. The Mn content of the aluminum alloy forming the core material is 0.5 to 2.0 mass %, and preferably 0.8 to 1.8 mass %. By setting the Mn content of the aluminum alloy forming the core material to the range described above, the strength of the core material is increased and the potential has a proper value. By contrast, when the Mn content of the aluminum alloy forming the core material is less than the range described above, the strength as the core material of the material forming a heat exchanger becomes insufficient. In addition, the Mn content less than the range described above reduces the difference in content from the Mn content of the intermediate layer described later, and causes failure in securement of a large difference in potential between the intermediate layer and the core material. In addition, the Mn content exceeding the range described above causes generation of giant crystallized products in casting and/or reduction in a rolling property, and causes difficulty in manufacturing.

Cu improves the strength, and ennobles the potential by solid solution. Cu has a larger potential ennoblement effect than that of Mn. The Cu content of the aluminum alloy forming the core material is 0.3 to 1.0 mass %, and preferably 0.4 to 0.9 mass %. By setting the Cu content of the aluminum alloy forming the core material to the range described above, the strength of the core material is increased and the potential has a proper value. By contrast, when the Cu content of the aluminum alloy forming the core material is less than the range described above, the strength as the core material of the material forming a heat exchanger becomes insufficient. In addition, the Cu content less than the range described above causes failure in securement of a large difference in potential between the intermediate layer and the core material. In addition, the Cu content exceeding the range described above tends to cause cracks in casting, or decreases the solidus temperature and may cause melting in brazing heating.

Si improves the strength, and ennobles the potential by solid solution. The Si content of the aluminum alloy forming the core material is 1.2 mass % or less, and preferably 1.0 mass % or less. By setting the Si content of the aluminum alloy forming the core material to the range described above, the strength of the core material is increased and the potential has a proper value. By contrast, when the Si content of the aluminum alloy forming the core material exceeds the range described above, the solidus temperature may be reduced and melting in brazing heating may occur.

Fe improves the strength. The Fe content of the aluminum alloy forming the core material is 1.0 mass % or less, and preferably 0.8 mass % or less. By setting the Fe content of the aluminum alloy forming the core material to the range described above, the strength of the core material is increased. By contrast, when the Fe content of the aluminum alloy forming the core material exceeds the range described above, a generation quantity of an Al—Fe-based intermetallic compound with a noble potential is increased and self-corrosion resistance is reduced.

The aluminum alloy forming the core material of the aluminum alloy brazing sheet for a heat exchanger may further include one or two or more of Ti of 0.3 mass % or less, Zr of 0.3 mass % or less, and Cr of 0.3 mass % or less, in addition to the elements described above.

The Ti content of the aluminum alloy forming the core material is 0.3 mass % or less. With the core material including Ti of the range described above, high Ti concentration regions and low Ti concentration regions are formed in the aluminum alloy, and these regions are alternately distributed in a layered manner in the thickness direction of the material. Because the low Ti concentration regions are corroded with priority over the high Ti concentration regions, the corrosion has a layered shape, and progress of corrosion in the thickness direction is suppressed. This structure improves pitting corrosion resistance and grain boundary corrosion resistance. This structure also improves strength at ordinary temperature and high temperature. By contrast, when the Ti content of the aluminum alloy forming the core material exceeds the range described above, giant crystallized products are generated in casting, and manufacturing of the aluminum alloy brazing sheet becomes difficult.

The Zr content of the aluminum alloy forming the core material is 0.3 mass %. With the core material including Zr of the range described above, the grains in recrystallization in brazing heating are coarsened. This structure reduces the grain boundary density, suppresses erosion caused by infiltration of Al—Si alloy liquid-phase brazing filler metal into the grain boundary, and suppresses degranulation caused by preferential corrosion of the grain boundary. By contrast, when the Zr content of the aluminum alloy forming the core material exceeds the range described above, giant crystallized products are generated in casting, and manufacturing of the aluminum alloy brazing sheet becomes difficult. Including Cr produces a similar effect as that produced by including Zr. The Cr content of the aluminum alloy forming the core material is 0.3 mass %. By contrast, when the Cr content of the aluminum alloy forming the core material exceeds the range described above, giant crystallized products are generated in casting, and manufacturing of the aluminum alloy brazing sheet becomes difficult. When Zr and Cr are added compositely, the effects thereof are obtained compositely.

The intermediate layer of the aluminum alloy brazing sheet for a heat exchanger is formed of an aluminum alloy including Mn of 0.2 mass % or more and less than 0.35 mass %, Si of 0.6 mass % or less, Fe of 0.7 mass % or less, and Cu of 0.1 mass % or less, with the balance being Al and inevitable impurities.

In the intermediate layer, the Mn content of the intermediate layer is set lower than the Mn content of the core material to set the potential of the intermediate layer lower than that of the core material and increase the difference in potential from the core material. The Mn content of the aluminum alloy forming the intermediate layer is 0.2 mass % or more and less than 0.35 mass %. By setting the Mn content of the aluminum alloy forming the intermediate layer to the range described above, the difference in potential between the intermediate layer and the core material has a proper value. By contrast, when the Mn content of the aluminum alloy forming the intermediate layer is less than the range described above, deformation resistance of the intermediate layer is reduced, and the clad rolling property thereof is reduced. In addition, the Mn content thereof exceeding the range described above ennobles the potential of the intermediate layer, and causes difficulty in securing a large difference in potential from the core material.

In the intermediate layer, the Cu content having a large potential ennobling effect is limited to the range described later, to maintain the potential at low potential and increase a difference in potential from the core material. The Cu content of the aluminum alloy forming the intermediate layer is 0.1 mass % or less, preferably 0.05 mass % or less, and more preferably 0.03 mass % or less. By setting the Cu content of the aluminum alloy forming the intermediate layer to the range described above, the difference in potential between the intermediate layer and the core material has a proper value.

In the intermediate layer, by setting the Si content of the intermediate layer lower than the Si content of the core material, the potential of the intermediate layer is set lower than that of the core material, and the difference in potential from the core material can be increased. The Si content of the aluminum alloy forming the intermediate layer is 0.6 mass % or less, and preferably 0.3 mass % or less. By setting the Si content of the aluminum alloy forming the intermediate layer to the range described above, the difference in potential between the intermediate layer and the core material has a proper value. By contrast, when the Si content of the aluminum alloy forming the intermediate layer exceeds the range described above, the potential of the intermediate layer is ennobled, and no large difference in potential from the core material is secured.

The aluminum alloy forming the intermediate layer may include Fe of 0.7 mass % or less, and preferably 0.4 mass % or less, as inevitable impurities. By contrast, when the Fe content of the aluminum alloy forming the intermediate layer exceeds the range described above, the generation quantity of an Al—Fe-based intermetallic compound with a noble potential increases, and the self-corrosion resistance decreases.

The aluminum alloy forming the intermediate layer of the aluminum alloy brazing sheet for a heat exchanger may include, in addition to the elements described above, one or two or more of Ti of 0.3 mass % or less, Zr of 0.3 mass % or less, and Cr of 0.3 mass % or less.

The Ti content of the aluminum alloy forming the intermediate layer is 0.3 mass % or less. With the intermediate layer including Ti of the range described above, high Ti concentration regions and low Ti concentration regions are formed in the aluminum alloy, and these regions are alternately distributed in a layered manner in the thickness direction of the material. Because the low Ti concentration regions are corroded with priority over the high Ti concentration regions, the corrosion has a layered shape, and progress of corrosion in the thickness direction is suppressed. This structure improves pitting corrosion resistance and grain boundary corrosion resistance. This structure also improves strength at ordinary temperature and high temperature. By contrast, when the Ti content of the aluminum alloy forming the intermediate layer exceeds the range described above, giant crystallized products are generated in casting, and manufacturing of the aluminum alloy brazing sheet becomes difficult.

The Zr content of the aluminum alloy forming the intermediate layer is 0.3 mass %. With the intermediate layer including Zr of the range described above, the grains in recrystallization in brazing heating are coarsened. This structure reduces the grain boundary density, suppresses erosion caused by infiltration of Al—Si alloy liquid-phase brazing filler metal into the grain boundary, and suppresses degranulation caused by preferential corrosion of the grain boundary. By contrast, when the Zr content of the aluminum alloy forming the intermediate layer exceeds the range described above, giant crystallized products are generated in casting, and manufacturing of the aluminum alloy brazing sheet becomes difficult. Including Cr produces a similar effect as that produced by including Zr. The Cr content of the aluminum alloy forming the intermediate layer is 0.3 mass %. By contrast, when the Cr content of the aluminum alloy forming the intermediate layer exceeds the range described above, giant crystallized products are generated in casting, and manufacturing of the aluminum alloy brazing sheet becomes difficult. When Zr and Cr are added compositely, the effects thereof are obtained compositely.

The brazing material layer of the aluminum alloy brazing sheet for a heat exchanger is formed of an aluminum alloy including Si of 4 mass % or more and 13 mass % or less, with the balance being Al and inevitable impurities.

The Si content of the aluminum alloy forming the brazing material layer is 4 to 13 mass %, and preferably 6 to 13 mass %. By contrast, when the Si content of the aluminum alloy forming the brazing material layer is less than the range described above, the quantity of the generated liquid-phase brazing filler metal is small, and good brazing joint becomes impossible. When it exceeds the range described above, an Al—Si-based alloy hypereutectic region is formed, and coarse Si particles are easily generated in casting. Coarse Si particles remaining in the product may cause local melting in brazing.

The aluminum alloy forming the brazing material layer of the aluminum alloy brazing sheet for a heat exchanger may further include Sr of 0.1 mass % or less, in addition to the elements described above.

The Sr content of the aluminum alloy forming the brazing material layer is 0.1 mass % or less. By inclusion of Sr in the aluminum alloy forming the brazing material layer, the eutectic structure of the Al—Si alloy is refined and dispersed. This structure more uniformly generates liquid-phase brazing filler metal in brazing heating, improves flow of the brazing filler metal, and improves the brazability. This structure also suppresses generation of coarse Si particles, and removes the possibility of occurrence of local melting. By contrast, when the Sr content forming the brazing material layer exceeds the range described above, an Al—Si—Sr-based compound is crystallized, and the eutectic structure is not refined.

In the aluminum alloy brazing sheet for a heat exchanger, the difference between the Si content of the aluminum alloy forming the core material and the Si content of the aluminum alloy forming the intermediate layer (core material Si content—intermediate layer Si content) preferably exceeds 0 mass %. However, the value (core material Si—intermediate layer Si) may be 0 mass % or less within the range in which the difference in potential between the intermediate layer and the core material is not reversed, when the difference in potential between the intermediate layer and the core material has a proper value by virtue of the difference between the Cu content of the aluminum alloy forming the core material and the Cu content of the aluminum alloy forming the intermediate layer and the difference between the Mn content of the aluminum alloy forming the core material and the Mn content of the aluminum alloy forming the intermediate layer.

In the aluminum alloy brazing sheet for a heat exchanger, the clad ratio of the intermediate layer is preferably 5 to 30%. When the clad ratio of the intermediate layer is less than the range described above, the volume thereof as a sacrificial layer is small, improvement in corrosion resistance easily becomes insufficient, and manufacturing of the aluminum alloy brazing sheet tends to be difficult. The clad ratio of the intermediate layer exceeding the range described above tends to decrease the clad rolling property and tends to cause difficulty in manufacturing.

In the aluminum alloy brazing sheet for a heat exchanger, the clad ratio of the brazing material layer is preferably 5 to 20%. When the clad ratio of the brazing material layer is less than the range described above, the brazing material quantity becomes insufficient, difficulty in securement of the brazability tends to increase, and difficulty in manufacturing of the aluminum alloy brazing sheet tends to increase. The clad ratio thereof exceeding the range described above causes excessive brazing material quantity, tends to cause a large change in thickness due to melting of the brazing material, and causes a clearance. In addition, with the clad ratio exceeding the range described above, excessive brazing filler metal flows into the coolant passage to cause clogging, and the clad rolling property decreases to cause difficulty in manufacturing.

The aluminum alloy brazing sheet for a heat exchanger according to the present invention is used for manufacturing a member necessarily having a closed space inside, such as a tube, a header, and a tank forming a coolant passage of an automobile heat exchanger, an air conditioner, and an industrial heat exchanger or the like, and formed and brazed into a shape of a member having a closed space inside such that the air side, that is, the external side is a brazing material layer and the internal side is an internal surface of the core material. The atmosphere, the heating temperature, and time in brazing are not particularly limited, and the brazing method is not particularly limited.

A heat exchanger for an automobile manufactured using the aluminum alloy brazing sheet material for a heat exchanger according to the present invention exhibits good corrosion resistance even in a harsh market corrosion environment.

The following is an explanation of a method for manufacturing an aluminum alloy brazing sheet for a heat exchanger according to the present invention. As the method for manufacturing an aluminum alloy brazing sheet for a heat exchanger according to the present invention, the following four forms are mentioned, that is, Manufacturing Method 1, Manufacturing Method 2, Manufacturing Method 3, and Manufacturing Method 4.

In each of Manufacturing Methods 1 to 4, first, an aluminum alloy ingot for a core material, an aluminum alloy ingot for an intermediate layer, and an aluminum alloy ingot for a brazing material layer with predetermined compositions are manufactured by a routine procedure.

The aluminum alloy ingot for the core material is formed of an aluminum alloy including Si of 1.2 mass % or less, and preferably 1.0 mass % or less, Fe of 1.0 mass % or less, and preferably 0.8 mass % or less, Cu of 0.3 to 1.0 mass %, and preferably 0.4 to 0.9 mass %, and Mn of 0.5 to 2.0 mass %, and preferably 0.8 to 18 mass %, and further includes, if necessary, one or two or more of Ti of 0.3 mass % or less, Zr of 0.3 mass % or less, and Cr of 0.3 mass % or less, with the balance being Al and inevitable impurities.

The aluminum alloy ingot for the intermediate layer is formed of an aluminum alloy including Mn of 0.2 mass % or more and less than 0.35 mass %, Si of 0.6 mass % or less, and preferably 0.3 mass % or less, Fe of 0.7 mass % or less, and preferably 0.4 mass % or less, and Cu of 0.1 mass % or less, preferably 0.05 mass % or less, and particularly preferably 0.03 mass % or less, and, if necessary, further including one or two or more of Ti of 0.3 mass % or less, Zr of 0.3 mass % or less, and Cr of 0.3 mass % or less, with the balance being Al and inevitable impurities.

The aluminum alloy ingot for the brazing material layer is formed of an aluminum alloy including Si of 4 to 13 mass %, and preferably 6 to 13 mass %, and further includes, if necessary, Sr of 0.1 mass % or less, with the balance being Al and inevitable impurities.

Thereafter, in Manufacturing Method 1, at least the aluminum alloy ingot for the core material is subjected to homogenization at homogenization temperature of 550 to 620° C. and with homogenization time of 3 to 20 hours. The homogenization temperature is preferably 570 to 620° C. The homogenization time is preferably 5 to 20 hours. The homogenization enables suppression of brazing erosion caused by strain provided when the aluminum alloy brazing sheet for a heat exchanger is processed into a member for a heat exchanger. In Manufacturing Method 1, after the aluminum alloy ingot for the core material is homogenized, the aluminum alloy ingot for the core material may be further retained at 400 to 550° C. for 3 to 20 hours to perform thermal treatment.

In Manufacturing Method 1, the aluminum alloy ingot for the intermediate layer may be subjected to homogenization at homogenization temperature of 550 to 620° C., and preferably 570 to 620° C., and homogenization time of 3 to 20 hours, and preferably 5 to 20 hours. In Manufacturing Method 1, after the aluminum alloy ingot for the intermediate layer is homogenized, the aluminum alloy ingot for the intermediate layer may be further retained at 400 to 550° C. for 3 to 20 hours to perform thermal treatment.

In Manufacturing Method 1, the brazing material layer may be subjected to homogenization with proper conditions, or may be subjected to no homogenization.

Thereafter, in Manufacturing Method 1, after the homogenization, the aluminum alloy ingot for the brazing material layer, the aluminum alloy ingot for the intermediate layer, and the aluminum alloy ingot for the core material are stacked in this order and subjected to clad hot rolling and cold rolling. In Manufacturing Method 1, in the rolling condition for the clad hot rolling, a start temperature is 400 to 550° C. In Manufacturing Method 1, cold rolling is performed a plurality of times, and the rolling conditions and the number of times of cold rolling are properly selected such that the thickness after cold rolling is a predetermined thickness.

In Manufacturing Method 1, no annealing is performed during cold rolling, and recrystallization rolling is performed only after cold rolling is performed to acquire the final thickness. The temperature of recrystallization annealing of Manufacturing Method 1 is 250 to 450° C., and preferably 280 to 430° C., and the retention time of recrystallization annealing is 2 to 10 hours, and preferably 2 to 8 hours.

In Manufacturing Method 2, at least the aluminum alloy ingot for the core material is subjected to homogenization at homogenization temperature of 400 to 550° C. and with homogenization time of 3 to 20 hours. The homogenization temperature is preferably 420 to 530° C. The homogenization time is preferably 5 to 20 hours. The homogenization enables suppression of brazing erosion caused by strain provided when the aluminum alloy brazing sheet for a heat exchanger is processed into a member for a heat exchanger.

In Manufacturing Method 2, the aluminum alloy ingot for the intermediate layer may be subjected to homogenization at homogenization temperature of 400 to 550° C., and preferably 420 to 530° C., and homogenization time of 3 to 20 hours, and preferably 5 to 20 hours.

In Manufacturing Method 2, the brazing material layer may be subjected to homogenization with proper conditions, or may be subjected to no homogenization.

Thereafter, in Manufacturing Method 2, after the homogenization, the aluminum alloy ingot for the brazing material layer, the aluminum alloy ingot for the intermediate layer, and the aluminum alloy ingot for the core material are stacked in this order and subjected to clad hot rolling and cold rolling. In Manufacturing Method 2, in the rolling condition for the clad hot rolling, a start temperature is 400 to 550° C. In Manufacturing Method 2, cold rolling is performed a plurality of times, and the rolling conditions and the number of times of cold rolling are properly selected such that the thickness after cold rolling is a predetermined thickness.

In Manufacturing Method 2, no annealing is performed during cold rolling, and recovery rolling is performed only after cold rolling is performed to acquire the final thickness. The temperature of recovery annealing of Manufacturing Method 2 is 200 to 400° C., and preferably 220 to 380° C., and the retention time of recovery annealing is 2 to 10 hours, and preferably 2 to 8 hours.

In Manufacturing Method 3, at least the aluminum alloy ingot for the core material is subjected to homogenization at homogenization temperature of 400 to 550° C. and with homogenization time of 3 to 20 hours. The homogenization temperature is preferably 420 to 530° C. The homogenization time is preferably 5 to 20 hours. The homogenization enables suppression of brazing erosion caused by strain provided when the aluminum alloy brazing sheet for a heat exchanger is processed into a member for a heat exchanger.

In Manufacturing Method 3, the aluminum alloy ingot for the intermediate layer may be subjected to homogenization at homogenization temperature of 400 to 550° C., and preferably 420 to 530° C., and homogenization time of 3 to 20 hours, and preferably 5 to 20 hours.

In Manufacturing Method 3, the brazing material layer may be subjected to homogenization with proper conditions, or may be subjected to no homogenization.

Thereafter, in Manufacturing Method 3, after the homogenization, the aluminum alloy ingot for the brazing material layer, the aluminum alloy ingot for the intermediate layer, and the aluminum alloy ingot for the core material are stacked in this order and subjected to clad hot rolling and cold rolling. In Manufacturing Method 3, in the rolling condition for the clad hot rolling, a start temperature is 400 to 550° C. In Manufacturing Method 3, cold rolling is performed a plurality of times, and the rolling conditions and the number of times of cold rolling are properly selected such that the thickness after cold rolling is a predetermined thickness.

In Manufacturing Method 3, recrystallization annealing or recovery annealing is performed during cold rolling and, after recrystallization annealing or recovery annealing, cold rolling is performed to acquire the final thickness. The temperature of recrystallization annealing of Manufacturing Method 3 is 250 to 450° C., and preferably 280 to 430° C., and the retention time of recrystallization annealing is 2 to 10 hours, and preferably 2 to 8 hours. The temperature of recovery annealing of Manufacturing Method 3 is 200 to 400° C., and preferably 220 to 380° C., and the retention time of recovery annealing is 2 to 10 hours, and preferably 2 to 8 hours.

In Manufacturing Method 4, at least the aluminum alloy ingot for the core material is subjected to homogenization at homogenization temperature of 400 to 550° C. and with homogenization time of 3 to 20 hours. The homogenization temperature is preferably 420 to 530° C. The homogenization time is preferably 5 to 20 hours. The homogenization enables suppression of brazing erosion caused by strain provided when the aluminum alloy brazing sheet for a heat exchanger is processed into a member for a heat exchanger.

In Manufacturing Method 4, the aluminum alloy ingot for the intermediate layer may be subjected to homogenization at homogenization temperature of 400 to 550° C., and preferably 420 to 530° C., and homogenization time of 3 to 20 hours, and preferably 5 to 20 hours.

In Manufacturing Method 4, the brazing material layer may be subjected to homogenization with proper conditions, or may be subjected to no homogenization.

Thereafter, in Manufacturing Method 4, after the homogenization, the aluminum alloy ingot for the brazing material layer, the aluminum alloy ingot for the intermediate layer, and the aluminum alloy ingot for the core material are stacked in this order and subjected to clad hot rolling and cold rolling. In Manufacturing Method 4, in the rolling condition for the clad hot rolling, a start temperature is 400 to 550° C. In Manufacturing Method 4, cold rolling is performed a plurality of times, and the rolling conditions and the number of times of cold rolling are properly selected such that the thickness after cold rolling is a predetermined thickness.

In Manufacturing Method 4, recovery annealing is performed during cold rolling and, after recovery annealing, cold rolling is performed to acquire the final thickness. After cold rolling to acquire the final thickness is performed, recovery annealing is further performed. The temperature of recovery annealing of Manufacturing Method 4 is 200 to 400° C., and preferably 220 to 380° C., and the retention time of recovery annealing is 2 to 10 hours, and preferably 2 to 8 hours.

As described above, the aluminum alloy brazing sheet for a heat exchanger according to the present invention is manufactured.

Specifically, the aluminum alloy brazing sheet for a heat exchanger according to the present invention includes a three-layer material in which an air-side surface of a core material is cladded and stacked with an intermediate layer and a brazing material layer in this order from the core material side. The core material, the intermediate layer, and the brazing material layer have the predetermined chemical compositions described above, and, in the manufacturing process, at least the aluminum alloy forming the core material is subjected to homogenization, subjected to clad hot rolling and cold rolling after the homogenization, subjected to no annealing during the cold rolling, and subjected to recrystallization annealing only at the final thickness.

As another example, the aluminum alloy brazing sheet for a heat exchanger according to the present invention includes a three-layer material in which an air-side surface of a core material is cladded and stacked with an intermediate layer and a brazing material layer in this order from the core material side. The core material, the intermediate layer, and the brazing material layer have the predetermined chemical compositions described above, and, in the manufacturing process, at least the aluminum alloy forming the core material is subjected to homogenization, subjected to clad hot rolling and cold rolling after the homogenization, subjected to no annealing during the cold rolling, and subjected to recovery annealing only at the final thickness.

As another example, the aluminum alloy brazing sheet for a heat exchanger according to the present invention includes a three-layer material in which an air-side surface of a core material is cladded and stacked with an intermediate layer and a brazing material layer in this order from the core material side. The core material, the intermediate layer, and the brazing material layer have the predetermined chemical compositions described above, and, in the manufacturing process, at least the aluminum alloy forming the core material is subjected to homogenization, subjected to clad hot rolling and cold rolling after the homogenization, subjected to recrystallization annealing or recovery annealing during the cold rolling, and subjected to cold rolling to acquire the final thickness after the recrystallization annealing or the recovery annealing.

As another example, the aluminum alloy brazing sheet for a heat exchanger according to the present invention includes a three-layer material in which an air-side surface of a core material is cladded and stacked with an intermediate layer and a brazing material layer in this order from the core material side. The core material, the intermediate layer, and the brazing material layer have the predetermined chemical compositions described above, and, in the manufacturing process, at least the aluminum alloy forming the core material is subjected to homogenization, subjected to clad hot rolling and cold rolling after the homogenization, subjected to recovery annealing during the cold rolling, subjected to cold rolling to acquire the final thickness after the recovery annealing, and subjected to further recovery annealing after the cold rolling to acquire the final thickness.

The following is a specific explanation of the present invention with examples, but the present invention is not limited to the examples described hereinafter.

EXAMPLES

To manufacture a tube member forming the coolant passage of a heat exchanger, aluminum alloys for an intermediate layer listed in Table 1, aluminum alloys for a core material listed in Table 2, and aluminum alloys for a brazing material layer listed in Table 3 were casted. Aluminum alloy ingots for the intermediate layer and aluminum alloy ingots for the core material were subjected to homogenization in which the ingots were retained at 600° C. for 10 hours.

Thereafter, the ingot surface of each of the aluminum alloys was subjected to facing. The aluminum alloy ingots for the brazing material layer and the aluminum alloy ingots for the intermediate layer were subjected to hot rolling to predetermined thicknesses, and the ingots were combined and subjected to clad hot rolling to form the three-layer clad materials listed in Table 4.

Thereafter, each of the materials was subjected to cold rolling to a thickness of 0.3 mm without performing annealing during the rolling, and recrystallized at final annealing to perform O temper and manufacture the aluminum alloy brazing sheet for a heat exchanger.

Each of the acquired aluminum alloy brazing sheets for heat exchangers has a structure in which the brazing material, the intermediate layer, and the core material are arranged from the external surface side.

The following Evaluations 1 to 3 were performed using these aluminum alloy brazing sheets.

Evaluation 1

Table 5 lists manufacturing results of these materials. In the casting and the rolling, the materials that were successfully manufactured in good state without any problem were provided with the mark "O", the materials that were manufactured with some difficulty are provided with the mark "Δ", and the materials manufacturing of which ended in failure are provided with the mark "x".

Evaluation 2

Each of the materials that could be manufactured in Evaluation 1 was formed into a tube of an ordinary drawn-cup type having an ordinary drawn-cup type shape in a portion in which the brazing material layers were bonded. In the tube, in a portion in which the core material sides were bonded in an ordinary drawn-cup shape, bending was performed to fold back the brazing material layer sides such that the brazing material layers were bonded. Thereafter, the tube was assembled with members, such as an ordinary outer bare fin and an ordinary clad inner fin, to form a drawn-cup heat exchanger by brazing heating. A flux liquid mixture obtained by suspending Nocolok flux in water was applied to the assembled heat exchanger with a spray and thereafter dried. As the brazing heating conditions, each of the structures was heated to 600° C. at average temperature increase speed of 50° C./min in a nitrogen gas atmosphere, and maintained for three minutes, and thereafter the temperature was decreased to room temperature. Thereafter, the external appearance thereof was observed and leakage test was performed. Table 6 lists results thereof. The structures without any problem in external appearance and without leakage are provided with the mark "O", and the structures in which local melting and/or leakage occurred are provided with the mark "x".

Evaluation 3

In the same manner, each of the materials that could be manufactured in Evaluation 1 was subjected to brazing heating with a single plate, and subjected to SWAAT test provided under ASTM-G85 A3. The brazing heating conditions were the same conditions as those of Evaluation 2. The evaluation surface in SWAAT was the external surface side, and the test time was 1,000 h. Table 7 lists results of measurement of the maximum corrosion depth after the test. The structures with the maximum corrosion depth of 0.1 mm or less are provided with the mark "O", the structures with the maximum corrosion depth more than 0.1 mm and 0.2 mm or less are provided with the mark "Δ", and the structures with the maximum corrosion depth more than 0.2 mm and reaching penetration are provided with the mark "x". Only in Evaluation 3, a three-layer material serving as a conventional material (test material No. 26) was evaluated as a comparative example. The three-layer material has the same thickness as those of the examples, an A4343/A3003/A4343 structure, and a 10% clad ratio for both surfaces.

TABLE 1

| No. | Si | Fe | Cu | Mn | Ti | Sr | Zr |
|-----|-----|-----|------|------|------|----|------|
| 1A  | 0.1 | 0.2 | 0.02 | 0.3  | 0    | 0  | 0    |
| 1B  | 0.6 | 0.7 | 0.1  | 0.34 | 0    | 0  | 0    |
| 1C  | 0.1 | 0.2 | 0.02 | 0.2  | 0    | 0  | 0    |
| 1D  | 0.1 | 0.2 | 0.02 | 0.3  | 0.15 | 0  | 0    |
| 1E  | 0.1 | 0.2 | 0.02 | 0.3  | 0    | 0  | 0.15 |
| 1F  | 0.1 | 0.2 | 0.02 | 0.3  | 0.15 | 0  | 0.15 |
| 1a  | 0.7 | 0.8 | 0.2  | 0.4  | 0    | 0  | 0    |
| 1b  | 0.1 | 0.2 | 0.02 | 0.1  | 0    | 0  | 0    |

TABLE 2

| No. | Si  | Fe  | Cu  | Mn  | Ti   | Sr | Zr   |
|-----|-----|-----|-----|-----|------|----|------|
| 2A  | 0.2 | 0.2 | 0.5 | 1.2 | 0    | 0  | 0    |
| 2B  | 1.2 | 1.0 | 1.0 | 2.0 | 0    | 0  | 0    |
| 2C  | 0.2 | 0.2 | 0.3 | 0.5 | 0    | 0  | 0    |
| 2D  | 0.2 | 0.2 | 0.5 | 1.2 | 0.15 | 0  | 0    |

TABLE 2-continued

| No. | Si  | Fe  | Cu  | Mn  | Ti   | Sr | Zr   |
|-----|-----|-----|-----|-----|------|----|------|
| 2E  | 0.2 | 0.2 | 0.5 | 1.2 | 0    | 0  | 0.15 |
| 2F  | 0.2 | 0.2 | 0.5 | 1.2 | 0.15 | 0  | 0.15 |
| 2a  | 1.4 | 1.5 | 1.2 | 2.5 | 0    | 0  | 0    |
| 2b  | 0.2 | 0.2 | 0.2 | 0.4 | 0    | 0  | 0    |

TABLE 3

| No. | Si  | Fe  | Cu | Mn | Ti | Sr   | Zr |
|-----|-----|-----|----|----|----|------|----|
| 3A  | 7.5 | 0.2 | 0  | 0  | 0  | 0    | 0  |
| 3B  | 13  | 0.2 | 0  | 0  | 0  | 0    | 0  |
| 3C  | 4   | 0.2 | 0  | 0  | 0  | 0    | 0  |
| 3D  | 7.5 | 0.2 | 0  | 0  | 0  | 0.03 | 0  |
| 3a  | 14  | 0.2 | 0  | 0  | 0  | 0    | 0  |
| 3b  | 3   | 0.2 | 0  | 0  | 0  | 0    | 0  |

TABLE 4

|             |     | External Brazing Material | | Intermediate Layer | | Core Material |
|-------------|-----|-------|------------|-------|------------|-------|
|             | No. | Alloy | Clad Ratio | Alloy | Clad Ratio | Alloy |
| Examples    | 1   | 3A    | 10         | 1A    | 15         | 2A    |
|             | 2   | 3A    | 10         | 1D    | 15         | 2A    |
|             | 3   | 3A    | 10         | 1E    | 15         | 2A    |
|             | 4   | 3A    | 10         | 1F    | 15         | 2A    |
|             | 5   | 3A    | 10         | 1A    | 15         | 2D    |
|             | 6   | 3A    | 10         | 1A    | 15         | 2E    |
|             | 7   | 3A    | 10         | 1A    | 15         | 2F    |
|             | 8   | 3A    | 10         | 1F    | 15         | 2F    |
|             | 9   | 3A    | 10         | 1B    | 15         | 2B    |
|             | 10  | 3A    | 10         | 1B    | 15         | 2C    |
|             | 11  | 3A    | 10         | 1C    | 15         | 2B    |
|             | 12  | 3A    | 10         | 1C    | 15         | 2C    |
|             | 13  | 3B    | 10         | 1A    | 15         | 2A    |
|             | 14  | 3C    | 10         | 1A    | 15         | 2A    |
| Comparative | 15  | 3A    | 10         | 1a    | 15         | 2A    |
| Examples    | 16  | 3A    | 10         | 1b    | 15         | 2A    |
|             | 17  | 3A    | 10         | 1A    | 15         | 2a    |
|             | 18  | 3A    | 10         | 1A    | 15         | 2b    |
|             | 19  | 3a    | 10         | 1A    | 15         | 2A    |
|             | 20  | 3b    | 10         | 1A    | 15         | 2A    |
|             | 21  | 3A    | 10         | 1a    | 15         | 2b    |
|             | 22  | 3A    | 4          | 1A    | 15         | 2A    |
|             | 23  | 3A    | 25         | 1A    | 15         | 2A    |
|             | 24  | 3A    | 10         | 1A    | 3          | 2A    |
|             | 25  | 3A    | 10         | 1A    | 35         | 2A    |

TABLE 5

| | No. | External Brazing Material Alloy | Clad Ratio | Intermediate Layer Alloy | Clad Ratio | Core Material Alloy | Thickness (mm) | Result | Determination |
|---|---|---|---|---|---|---|---|---|---|
| Examples | 1 | 3A | 10 | 1A | 15 | 2A | 0.3 | Good | ○ |
| | 2 | 3A | 10 | 1D | 15 | 2A | 0.3 | Good | ○ |
| | 3 | 3A | 10 | 1E | 15 | 2A | 0.3 | Good | ○ |
| | 4 | 3A | 10 | 1F | 15 | 2A | 0.3 | Good | ○ |
| | 5 | 3A | 10 | 1A | 15 | 2D | 0.3 | Good | ○ |
| | 6 | 3A | 10 | 1A | 15 | 2E | 0.3 | Good | ○ |
| | 7 | 3A | 10 | 1A | 15 | 2F | 0.3 | Good | ○ |
| | 8 | 3A | 10 | 1F | 15 | 2F | 0.3 | Good | ○ |
| | 9 | 3A | 10 | 1B | 15 | 2B | 0.3 | Good | ○ |
| | 10 | 3A | 10 | 1B | 15 | 2C | 0.3 | Good | ○ |
| | 11 | 3A | 10 | 1C | 15 | 2B | 0.3 | Good | ○ |
| | 12 | 3A | 10 | 1C | 15 | 2C | 0.3 | Good | ○ |
| | 13 | 3B | 10 | 1A | 15 | 2A | 0.3 | Good | ○ |
| | 14 | 3C | 10 | 1A | 15 | 2A | 0.3 | Good | ○ |
| Comparative Examples | 15 | 3A | 10 | 1a | 15 | 2A | 0.3 | Good | ○ |
| | 16 | 3A | 10 | 1b | 15 | 2A | 0.3 | Clad rolling was impossible | x |
| | 17 | 3A | 10 | 1A | 15 | 2a | 0.3 | Crack in casting, clad rolling was impossible | x |
| | 18 | 3A | 10 | 1A | 15 | 2b | 0.3 | Good | ○ |
| | 19 | 3a | 10 | 1A | 15 | 2A | 0.3 | Good | ○ |
| | 20 | 3b | 10 | 1A | 15 | 2A | 0.3 | Good | ○ |
| | 21 | 3A | 10 | 1a | 15 | 2b | 0.3 | Good | ○ |
| | 22 | 3A | 4 | 1A | 15 | 2A | 0.3 | Clad rolling was possible (difficult) | Δ |
| | 23 | 3A | 25 | 1A | 15 | 2A | 0.3 | Clad rolling was impossible | x |
| | 24 | 3A | 10 | 1A | 3 | 2A | 0.3 | Clad rolling was possible (difficult) | Δ |
| | 25 | 3A | 10 | 1A | 35 | 2A | 0.3 | Clad rolling was impossible | x |

TABLE 6

| | No. | External Brazing Material Alloy | Clad Ratio | Intermediate Layer Alloy | Clad Ratio | Core Material Alloy | Thickness (mm) | Result | Determination |
|---|---|---|---|---|---|---|---|---|---|
| Examples | 1 | 3A | 10 | 1A | 15 | 2A | 0.3 | Good | ○ |
| | 2 | 3A | 10 | 1D | 15 | 2A | 0.3 | Good | ○ |
| | 3 | 3A | 10 | 1E | 15 | 2A | 0.3 | Good | ○ |
| | 4 | 3A | 10 | 1F | 15 | 2A | 0.3 | Good | ○ |
| | 5 | 3A | 10 | 1A | 15 | 2D | 0.3 | Good | ○ |
| | 6 | 3A | 10 | 1A | 15 | 2E | 0.3 | Good | ○ |
| | 7 | 3A | 10 | 1A | 15 | 2F | 0.3 | Good | ○ |
| | 8 | 3A | 10 | 1F | 15 | 2F | 0.3 | Good | ○ |
| | 9 | 3A | 10 | 1B | 15 | 2B | 0.3 | Good | ○ |
| | 10 | 3A | 10 | 1B | 15 | 2C | 0.3 | Good | ○ |
| | 11 | 3A | 10 | 1C | 15 | 2B | 0.3 | Good | ○ |
| | 12 | 3A | 10 | 1C | 15 | 2C | 0.3 | Good | ○ |
| | 13 | 3B | 10 | 1A | 15 | 2A | 0.3 | Good | ○ |
| | 14 | 3C | 10 | 1A | 15 | 2A | 0.3 | Good | ○ |
| Comparative Examples | 15 | 3A | 10 | 1a | 15 | 2A | 0.3 | Good | ○ |
| | 16 | 3A | 10 | 1b | 15 | 2A | 0.3 | No evaluation (Manufacturing of material was impossible) | — |
| | 17 | 3A | 10 | 1A | 15 | 2a | 0.3 | No evaluation (Manufacturing of material was impossible) | — |
| | 18 | 3A | 10 | 1A | 15 | 2b | 0.3 | Good | ○ |
| | 19 | 3a | 10 | 1A | 15 | 2A | 0.3 | With local melting | x |
| | 20 | 3b | 10 | 1A | 15 | 2A | 0.3 | With brazing leakage | x |
| | 21 | 3A | 10 | 1a | 15 | 2b | 0.3 | Good | ○ |

TABLE 6-continued

| No. | External Brazing Material Alloy | External Brazing Material Clad Ratio | Intermediate Layer Alloy | Intermediate Layer Clad Ratio | Core Material Alloy | Thickness (mm) | Result | Determination |
|---|---|---|---|---|---|---|---|---|
| 22 | 3A | 4 | 1A | 15 | 2A | 0.3 | With brazing leakage | x |
| 23 | 3A | 25 | 1A | 15 | 2A | 0.3 | No evaluation (Manufacturing of material was impossible) | — |
| 24 | 3A | 10 | 1A | 3 | 2A | 0.3 | Good | ○ |
| 25 | 3A | 10 | 1A | 35 | 2A | 0.3 | No evaluation (Manufacturing of material was impossible) | — |

TABLE 7

| | No. | External Brazing Material Alloy | External Brazing Material Clad Ratio | Intermediate Layer Alloy | Intermediate Layer Clad Ratio | Core Material Alloy | Thickness (mm) | Maximum Corrosion Depth (mm) | Determination |
|---|---|---|---|---|---|---|---|---|---|
| Examples | 1 | 3A | 10 | 1A | 15 | 2A | 0.3 | 0.075 | ○ |
| | 2 | 3A | 10 | 1D | 15 | 2A | 0.3 | 0.07 | ○ |
| | 3 | 3A | 10 | 1E | 15 | 2A | 0.3 | 0.07 | ○ |
| | 4 | 3A | 10 | 1F | 15 | 2A | 0.3 | 0.065 | ○ |
| | 5 | 3A | 10 | 1A | 15 | 2D | 0.3 | 0.075 | ○ |
| | 6 | 3A | 10 | 1A | 15 | 2E | 0.3 | 0.075 | ○ |
| | 7 | 3A | 10 | 1A | 15 | 2F | 0.3 | 0.075 | ○ |
| | 8 | 3A | 10 | 1F | 15 | 2F | 0.3 | 0.065 | ○ |
| | 9 | 3A | 10 | 1B | 15 | 2B | 0.3 | 0.075 | ○ |
| | 10 | 3A | 10 | 1B | 15 | 2C | 0.3 | 0.08 | ○ |
| | 11 | 3A | 10 | 1C | 15 | 2B | 0.3 | 0.07 | ○ |
| | 12 | 3A | 10 | 1C | 15 | 2C | 0.3 | 0.075 | ○ |
| | 13 | 3B | 10 | 1A | 15 | 2A | 0.3 | 0.07 | ○ |
| | 14 | 3C | 10 | 1A | 15 | 2A | 0.3 | 0.08 | ○ |
| Comparative Examples | 15 | 3A | 10 | 1a | 15 | 2A | 0.3 | 0.2 | Δ |
| | 16 | 3A | 10 | 1b | 15 | 2A | 0.3 | No evaluation (Manufacturing of material was impossible) | — |
| | 17 | 3A | 10 | 1A | 15 | 2a | 0.3 | No evaluation (Manufacturing of material was impossible) | — |
| | 18 | 3A | 10 | 1A | 15 | 2b | 0.3 | 0.15 | Δ |
| | 19 | 3a | 10 | 1A | 15 | 2A | 0.3 | 0.07 | ○ |
| | 20 | 3b | 10 | 1A | 15 | 2A | 0.3 | 0.08 | ○ |
| | 21 | 3A | 10 | 1a | 15 | 2b | 0.3 | 0.3 (Penetration) | x |
| | 22 | 3A | 4 | 1A | 15 | 2A | 0.3 | 0.07 | ○ |
| | 23 | 3A | 25 | 1A | 15 | 2A | 0.3 | No evaluation (Manufacturing of material was impossible) | — |
| | 24 | 3A | 10 | 1A | 3 | 2A | 0.3 | 0.18 | Δ |
| | 25 | 3A | 10 | 1A | 35 | 2A | 0.3 | No evaluation (Manufacturing of malerial was impossible) | — |
| | 26 | A4343 | 10 | — | — | A3003 | 0.3 | 0.3 (Penetration) | x |

The following are results of Evaluations 1 to 3.

With respect to the manufacturing results of the three-layer clad materials, each of the materials of Examples exhibited good manufacturability. By contrast, in the materials of Comparative Examples, manufacturing of the materials of Nos. 16, 17, 23, and 25 was impossible because failure in bonding and/or cracks occurred in clad rolling. Cracks in some of the core materials occurred in casting in the material of No. 17. The materials of Nos. 22 and 24 had difficulty in clad rolling, but manufacturing thereof succeeded in the end.

With respect to results of brazing of the heat exchangers, each of the materials of Examples exhibited good brazability. By contrast, in the materials of Comparative Examples, local melting occurred in the material of No. 19, and leakage occurred in leakage test after brazing in the materials of Nos. 20 and 22.

With respect to the SWAAT test, each of the materials of the examples exhibited the maximum corrosion depth of 0.1 mm or less, and the maximum corrosion depth was substantially limited to a corrosion depth up to the total thickness of the brazing material of the external surface side and the intermediate layer. This fact suggests that the structures are in the sacrificial corrosion resistance period even after 1,000 h has passed, and the structures exhibited good corrosion resistance. By contrast, in the materials of Comparative Examples, the materials of Nos. 15, 18, and 24 exhibited a corrosion resistance more than 0.1 mm and 0.2 mm or less. It is considered that each of the materials had insufficient difference in potential between the intermediate layer and the core material, and the sufficient sacrificial anode effect was not sufficiently acquired. In addition, penetration occurred in the material of No. 21. It is considered that this was caused by a smaller difference in potential and acquisition of little sacrificial anode effect. Penetration also occurred in the three-layer material of No. 26 evaluated and compared as the conventional material. This has proved that corrosion resistance is improved by securing sufficient difference in potential between the intermediate layer and the core material even with the three-layer material.

The invention claimed is:

1. An aluminum alloy brazing sheet for a heat exchanger, the aluminum alloy brazing sheet comprising a three-layer material in which an air-side surface of a core material is cladded and stacked with an intermediate layer and a brazing material layer in this order from the core material side, wherein
the intermediate layer is formed of an aluminum alloy consisting of Mn of 0.2 mass % or more and less than 0.35 mass %, Si of 0.6 mass % or less, Fe of 0.7 mass % or less, and Cu of 0.1 mass % or less, and optionally one or more of Ti of 0.3 mass % or less, Zr of 0.3 mass % or less, and Cr of 0.3 mass % or less, with the balance being Al and inevitable impurities,
the core material is formed of an aluminum alloy including Si of 1.2 mass % or less, Fe of 1.0 mass % or less, Cu of 0.3 mass % or more and 1.0 mass % or less, and Mn of 0.5 mass % or more and 2.0 mass % or less, with the balance being Al and inevitable impurities,
the brazing material layer is formed of an aluminum alloy including Si of 4 mass % or more and 13 mass % or less, with the balance being Al and inevitable impurities, and
the intermediate layer has a clad ratio of 5 to 30% and the brazing material layer has a clad ratio of 5 to 20%.

2. The aluminum alloy brazing sheet for a heat exchanger according to claim 1, wherein the aluminum alloy forming the core material further includes one or two or more of Ti of 0.3 mass % or less, Zr of 0.3 mass % or less, and Cr of 0.3 mass % or less.

3. The aluminum alloy brazing sheet for a heat exchanger according to claim 1, wherein the aluminum alloy forming the brazing material layer further includes Sr of 0.1 mass % or less.

4. A method for manufacturing an aluminum alloy brazing sheet for a heat exchanger comprising stacking an aluminum alloy ingot for a brazing material layer formed of an aluminum alloy including Si of 4 to 13 mass %, with the balance being Al and inevitable impurities, an aluminum alloy ingot for an intermediate layer formed on an aluminum alloy consisting of Mn of 0.2 mass % or more and less than 0.35 mass %, Si of 0.6 mass % or less, Fe of 0.7 mass % or less, and Cu of 0.1 mass % or less, and optionally one or more of Ti of 0.3 mass % or less, Zr of 0.3 mass % or less, and Cr of 0.3 mass % or less, with the balance being Al and inevitable impurities, and an aluminum alloy ingot for a core material formed of an aluminum alloy including Si of 1.2 mass % or less, Fe of 1.0 mass % or less, Cu of 0.3 to 1.0 mass %, and Mn of 0.5 to 2.0 mass %, with the balance being Al and inevitable impurities in this order, and subjecting to clad hot rolling and cold rolling, wherein
at least the aluminum alloy ingot for the core material is subjected to homogenization, no annealing is performed during the cold rolling, and a recrystallization annealing is performed only after the cold rolling is performed to acquire a final thickness, and
the intermediate layer has a clad ratio of 5 to 30% and the brazing material layer has a clad ratio of 5 to 20%.

5. A method for manufacturing an aluminum alloy brazing sheet for a heat exchanger comprising stacking an aluminum alloy ingot for a brazing material layer formed of an aluminum alloy including Si of 4 to 13 mass %, with the balance being Al and inevitable impurities, an aluminum alloy ingot for an intermediate layer formed of an aluminum alloy consisting of Mn of 0.2 mass % or more and less than 0.35 mass %, Si of 0.6 mass % or less, Fe of 0.7 mass % or less, and Cu of 0.1 mass % or less, and optionally one or more of Ti of 0.3 mass % or less, Zr of 0.3 mass % or less, and Cr of 0.3 mass % or less, with the balance being Al and inevitable impurities, and an aluminum alloy ingot for a core material formed of an aluminum alloy including Si of 1.2 mass % or less, Fe of 1.0 mass % or less, Cu of 0.3 to 1.0 mass %, and Mn of 0.5 to 2.0 mass %, with the balance being Al and inevitable impurities in this order, and subjecting to clad hot rolling and cold rolling, wherein
at least the aluminum alloy ingot for the core material is subjected to homogenization, no annealing is performed during the cold rolling, and a recovery annealing is performed only after the cold rolling is performed to acquire a final thickness, and
the intermediate layer has a clad ratio of 5 to 30% and the brazing material layer has a clad ratio of 5 to 20%.

6. A method for manufacturing an aluminum alloy brazing sheet for a heat exchanger comprising stacking an aluminum alloy ingot for a brazing material layer formed of an aluminum alloy including Si of 4 to 13 mass %, with the balance being Al and inevitable impurities, an aluminum alloy ingot for an intermediate layer formed of an aluminum alloy consisting of Mn of 0.2 mass % or more and less than 0.35 mass %, Si of 0.6 mass % or less, Fe of 0.7 mass % or less, and Cu of 0.1 mass % or less, and optionally one or more of Ti of 0.3 mass % or less, Zr of 0.3 mass % or less, and Cr of 0.3 mass % or less, with the balance being Al and inevitable impurities, and an aluminum alloy ingot for a core material formed of an aluminum alloy including Si of 1.2 mass % or less, Fe of 1.0 mass % or less, Cu of 0.3 to 1.0 mass %, and Mn of 0.5 to 2.0 mass %, with the balance being Al and inevitable impurities in this order, and subjecting to clad hot rolling and cold rolling, wherein
at least the aluminum alloy ingot for the core material is subjected to homogenization, a recrystallization annealing or a recovery annealing is performed during the cold rolling, and another cold rolling is performed to acquire a final thickness after the recrystallization annealing or the recovery annealing, and
the intermediate layer has a clad ratio of 5 to 30% and the brazing material layer has a clad ratio of 5 to 20%.

7. A method for manufacturing an aluminum alloy brazing sheet for a heat exchanger comprising stacking an aluminum alloy ingot for a brazing material layer formed of an aluminum alloy including Si of 4 to 13 mass %, with the balance being Al and inevitable impurities, an aluminum alloy ingot for an intermediate layer formed of an aluminum alloy consisting of Mn of 0.2 mass % or more and less than 0.35 mass %, Si of 0.6 mass % or less, Fe of 0.7 mass % or less, and Cu of 0.1 mass % or less, and optionally one or more of Ti of 0.3 mass % or less, Zr of 0.3 mass % or less, and Cr of 0.3 mass % or less, with the balance being Al and inevitable impurities, and an aluminum alloy ingot for a core material formed of an aluminum alloy including Si of 1.2 mass % or less, Fe of 1.0 mass % or less, Cu of 0.3 to 1.0 mass %, and Mn of 0.5 to 2.0 mass %, with the balance being Al and inevitable impurities in this order, and subjecting to clad hot rolling and cold rolling, wherein at least the aluminum alloy ingot for the core material is subjected to homogenization, a recovery annealing is performed during another cold rolling, the cold rolling is performed to acquire a final thickness after the recovery annealing, and another recovery annealing is performed after the another cold rolling, and the intermediate layer has a clad ratio of 5 to 30% and the brazing material layer has a clad ratio of 5 to 20%.

8. The method for manufacturing an aluminum alloy brazing sheet for a heat exchanger according to claim 4, wherein the aluminum alloy ingot for the intermediate layer formed of the aluminum alloy further includes one or two or more of Ti of 0.3 mass % or less, Zr of 0.3 mass % or less, and Cr of 0.3 mass % or less.

9. The method for manufacturing an aluminum alloy brazing sheet for a heat exchanger according to claim 4, wherein the aluminum alloy ingot for the core material formed of the aluminum alloy further includes one or two or more of Ti of 0.3 mass % or less, Zr of 0.3 mass % or less, and Cr of 0.3 mass % or less.

10. The method for manufacturing an aluminum alloy brazing sheet for a heat exchanger according to claim 4, wherein the aluminum alloy ingot for the brazing material layer formed of the aluminum alloy further includes Sr of 0.1 mass % or less.

\* \* \* \* \*